F. J. STOKES.
EXTRACTION OF GREASE FROM SOLID MATERIAL.
APPLICATION FILED MAR. 10, 1920.
1,438,194.
Patented Dec. 12, 1922.
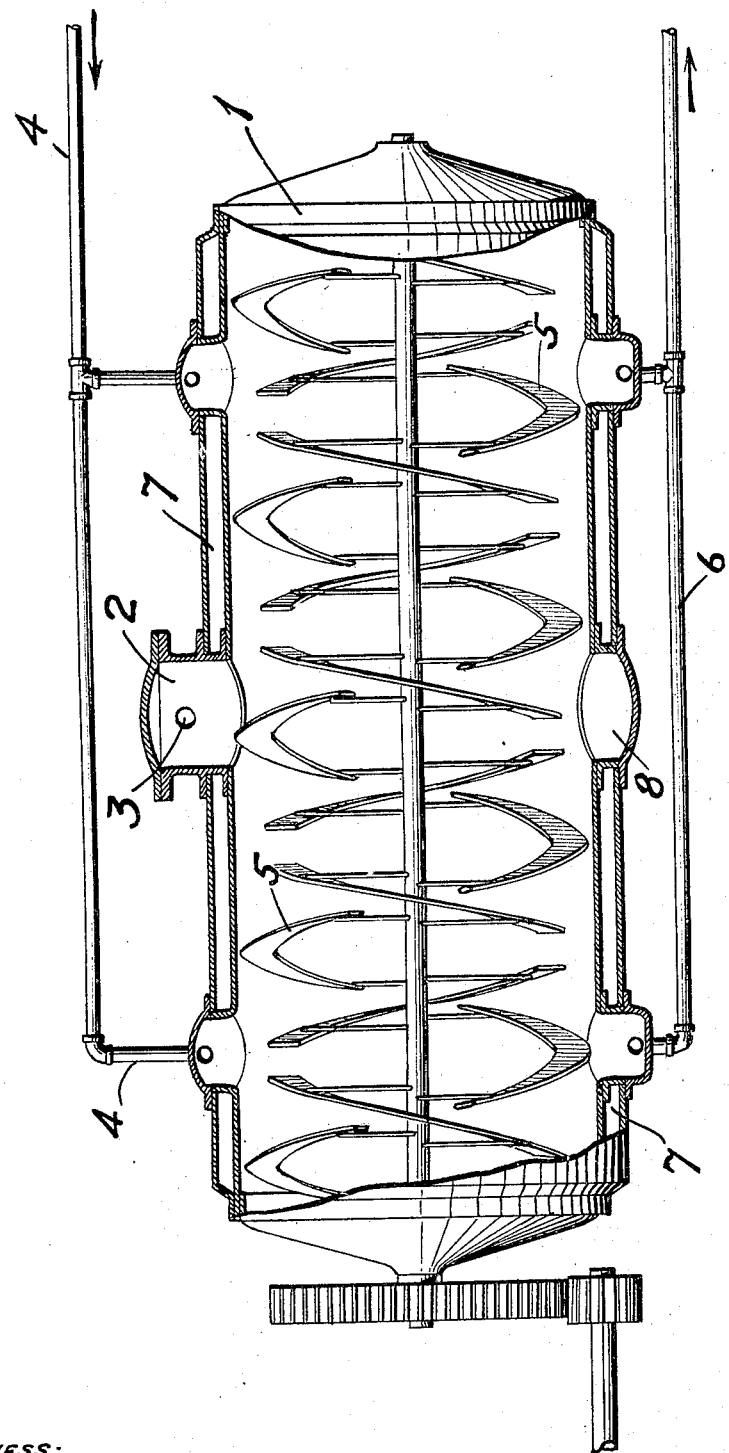
WITNESS:
INVENTOR
Francis J. Stokes
BY
ATTORNEY.

Patented Dec. 12, 1922.

1,438,194

UNITED STATES PATENT OFFICE.

FRANCIS J. STOKES, OF PHILADELPHIA, PENNSYLVANIA.

EXTRACTION OF GREASE FROM SOLID MATERIAL.

Application filed March 10, 1920. Serial No. 364,686.

*To all whom it may concern:*

Be it known that I, FRANCIS J. STOKES, a citizen of the United States, residing at Philadelphia, in the county of Philadelphia and State of Pennsylvania, have invented certain new and useful Improvements in the Extraction of Grease from Solid Material, of which the following is a specification.

The principal object of the present invention is to improve, expedite, simplify, cheapen, and make more commercially workable and practical the process of extracting fats or grease from various solid materials such as garbage, cotton seed oil, fish scrap, slaughterhouse refuse, and the like, and of recovering the residue in a dry state or condition.

To this and other ends hereinafter set forth the invention, briefly stated, consists in removing air and vapor from the solid material and breaking down its cellular structure by subjecting it, while cold, in a suitable retort to a vacuum, or more accurately, to a partial vacuum to adapt it for penetration by a solvent of grease or fat, flooding the contents of the retort with a solvent of grease or fat and agitating the admixture to dissolve the grease or fat, drawing off the fatty solution for the subsequent recovery therefrom of the fat or grease, drying the residue by heating the retort, and recovering the dry product.

Among the advantages of this process reference may be made to the fact that it can be conducted from start to finish in one piece of apparatus, and as the pressures to which that piece of apparatus is subjected are low, less than fifteen pounds to the square inch, the apparatus can be conveniently and inexpensively provided, maintained and operated, so that the process is simple, commercially workable and practical. Again the vacuum accomplishes the dual result of removing air and vapor trapped in the cold garbage and of breaking down the cellular structure of the garbage by suddenly expanding the vapor in the cells, thus allowing quick and thorough penetration of the solvent, and in this way the process is improved, expedited and made efficient, and the drying operation is facilitated.

In the drawings there is illustrated principally in longitudinal central section one form of apparatus suitable for the practice of the invention, and the invention will be further described in connection with that form of apparatus.

Solid material of the general kind referred to and at ordinary or atmosphere temperature is put into the retort 1, of the vacuum dryer, shown in the drawings, through the charging inlet 2; and while the retort is not subjected to heat, the material is subjected to a suddenly applied and considerable vacuum by exhausting air from the retort by way of the offtake 3, connected with an air exhaust pump or with a chamber from which the air has been exhausted. This removes air and vapor or moisture from the material and breaks down its cellular structure, because the vapor in the cells, suddenly expanding under the action of the vacuum, ruptures them. A solvent of grease or fat is introduced in the retort 1, by the connections 4, while the retort is unheated and is under less than atmospheric pressure or while the vacuum is maintained, and this solvent floods the material. In some cases the interior of the retort may not be kept under vacuum during the application of the solvent. The admixture of material and solvent is agitated by the mixer or stirrer 5, and the solvent penetrates the material and exercises its solvent action to the fullest degree by reason of the broken down condition of its cellular structure due to the action of the vacuum. The solvent is drawn off by way of the drain connections 6, after it has sufficiently dissolved the grease or fat. The retort 1, is then externally heated by the steam jacket 7, to drive off any remaining solvent and moisture or water and to reclaim the solid residue by drying it. The dry product is withdrawn from the retort by the discharge outlet 8, and the grease or fat is recovered from the solution previously drained off through the drain connections 6.

It will be obvious to those skilled in the art that modifications may be made in the details of procedure without departing from the spirit of the invention which is not to be limited to such matters or otherwise than as the prior art and the appended claims may require.

I claim:

The process of extracting grease from solid material which consists in removing air and vapor from the material by subjecting it, while cold, to the action of a vacuum and while under the action of a vacuum flooding it with a solvent of grease or fat, and breaking the vacuum and draining off the cold fatty solution, substantially as described.

FRANCIS J. STOKES.